United States Patent
Williams

[11] Patent Number: 5,762,314
[45] Date of Patent: Jun. 9, 1998

[54] DIAPHRAGM VALVE FOR CRYOGENIC APPLICATIONS

[75] Inventor: Karl M. Williams, Bryan, Tex.

[73] Assignee: O.I. Corporation, College Station, Tex.

[21] Appl. No.: 390,411

[22] Filed: Feb. 17, 1995

Related U.S. Application Data

[63] Continuation of Ser. No. 73,175, Jun. 8, 1993, abandoned.

[51] Int. Cl.$^6$ ................................................. F16K 31/128
[52] U.S. Cl. ............................. 251/25; 251/61.1; 251/367; 251/368
[58] Field of Search ........................... 251/61.1, 25, 367, 251/368

[56] References Cited

U.S. PATENT DOCUMENTS

| | | | |
|---|---|---|---|
| 2,638,127 | 5/1953 | Griswold | 137/793 |
| 3,582,037 | 6/1971 | Levesque | 251/61.1 |
| 3,867,958 | 2/1975 | Turnwall | 137/375 |
| 3,881,505 | 5/1975 | Dunkelis | 137/375 |
| 3,898,863 | 8/1975 | Wagner | 62/208 |
| 4,086,784 | 5/1978 | Wagner | 62/374 |
| 4,304,260 | 12/1981 | Turner et al. | 251/61.1 |
| 4,516,599 | 5/1985 | Nakaya et al. | 137/375 |
| 4,592,205 | 6/1986 | Brodbeck et al. | 62/49 |
| 4,607,489 | 8/1986 | Krongold | 62/49 |
| 4,715,578 | 12/1987 | Seltzer | 251/25 |
| 4,858,883 | 8/1989 | Webster | 251/61.1 |
| 4,869,282 | 9/1989 | Sittler et al. | 251/367 |
| 4,873,832 | 10/1989 | Porter | 62/49.2 |
| 5,088,515 | 2/1992 | Kamen | 251/61.1 |
| 5,203,368 | 4/1993 | Barstow et al. | 251/61.1 |

Primary Examiner—A. Michael Chambers

[57] ABSTRACT

A diaphragm valve for use with cryogenic systems controls the flow of cryogen and is capable of operating at high pressures for extended periods of time. The diaphragm consists of a polyamide film sandwiched between to manifold sections. A pilot valve controls the pressure of cryogen against one face of the diaphragm to open and close the diaphragm.

17 Claims, 1 Drawing Sheet

DIAPHRAGM VALVE FOR CRYOGENIC APPLICATIONS

This application is a continuation of application Ser. No. 08/073,175, filed Jun. 8, 1993, now abandoned.

FIELD OF THE INVENTION

The present invention relates generally to cryogenic systems used in scientific and analytical applications. More particularly, the invention involves a diaphragm valve for flow of cryogen in scientific and analytical applications including gas chromatography, superconductivity, magnetic resonance, and medicine.

RELATED ART

Cryogenic systems have been used advantageously in various scientific and technical applications including gas chromatography, superconductivity, magnetic resonance, and medicine. For example, in medical applications, cryogenic systems have been used for ultrarapid cooling of biological samples. In the field of gas chromatography, cryogenic focusing systems have been used to thermally trap analytes before injecting the analytes onto a column. A cryogen (such as liquid nitrogen) maintained at a low temperature is introduced for a controlled period of time to cool a cryogenic trap.

Typically, liquid nitrogen or other cryogen is stored in a pressurized tank at pressures of 20 to 300 psi. Insulated transfer lines from the pressurized tank include valves to control the flow of cryogen to the body or apparatus to be cooled. In certain applications, to obtain and/or maintain a desired temperature in the device, the valve or valves must be pulsed, or opened and closed repeatedly. For example, typical rates of pulsing are from one to 20 hertz. Thus, one or more valves may be pulsed in excess of one million cycles per week. A relatively high degree of control of the valves is important, even if the valves are not pulsed. It also is desirable that the valves be sufficiently durable to hold up for 20 to 50 million cycles.

In the past, motor actuated valves (i.e., U.S. Pat. No. 3,898,863), float type valves (i.e., U.S. Pat. Nos. 4,873,832, 4,592,205 and 4,607,489), and solenoid valves (i.e., U.S. Pat. No. 4,348,873) have been used in cryogenic applications. Of these three types of valves, solenoid valves are relatively inexpensive and their size has been acceptable for various cryogenic applications.

Certain types of diaphragm valves also have been used for cryogenic liquids and other liquids (i.e., U.S. Pat. Nos. 2,638,127 and 4,086,784). However, these have been used as pressure modulated valves, where the valve is opened on the pressure of that cryogen.

Generally, solenoid valves are rated at approximately one million cycles and are subject to failure when operated substantially beyond one million cycles. Failures primarily are related to the effects of low temperature (i.e., −196 degrees C. for liquid nitrogen). Solenoid valves are also subject to leakage, slow response, lack of reliability at low temperatures and/or low flow rates, and wear of contacting surfaces. Solenoid valves tend to stick when operating at low temperatures. Solenoid valves also have not been capable of opening and closing at a sufficiently high frequency which is necessary to achieve a high degree of control of liquid nitrogen flow.

For use in solenoid valves, a number of otherwise suitable materials become brittle at low temperature. Materials must perform satisfactorily over the complete range from cryogenic to room temperature. Stresses due to thermal contraction, and radial, axial and circumferential temperature gradients caused by non-uniform cooling rates are frequently encountered in the cool-down of cryogenic transfer lines and valves associated therewith. For example, seals at the center of the plunger in the valve harden at low temperature, resulting in leakage and/or blow-by across the solenoid valve.

To improve the reliability and effectiveness of solenoid valves, attempts have been made to reduce critical tolerances, use more advanced materials, and use redundant parts for sealing, such as multiple O-rings. However, such designs are prohibitively expensive for many applications where cost is a factor. Thus, it is an objective of the present invention to provide a relatively low cost valve for cryogenic applications that is not subject to leakage or other failure after long-term use.

In the past, solenoid valves capable of handling high pressures (i.e., above approximately 100 psi) have been limited to low flow rates. Typically, a solenoid operated cryogenic valve operates against a pressure/area differential, and the electromagnet is therefore the limiting factor on pressure. Thus, another objective of the present invention is to provide a relatively low cost valve for cryogenic applications that is capable of operating at pressures in excess of 100 psi without reducing the flow rate below what is useful practically.

Solenoid valves used in cryogenic applications have slow response times due at least in part to increased electric current requirements at low temperatures. Thus, another objective of the present invention is to provide an inexpensive cryogenic valve with an improved response time throughout the temperature range of liquid cryogen.

It is another objective of the present invention to provide a low cost valve for use in cryogenic systems that is durable for use in excess of fifty million cycles without failure.

A still further object of the present invention is to provide a valve for cryogenic applications that operates with minimal leakage at low temperatures during extended usage.

SUMMARY OF INVENTION

The diaphragm valve of the present invention includes a flexible diaphragm sandwiched between two manifold sections. The first manifold section includes inlet and outlet lines for the cryogen, and the second manifold section includes an inlet line to a pilot valve that taps off the same cryogen source. The pilot valve controls the pressure against one face of the diaphragm so that the diaphragm moves between open and closed positions based on the pressure differential between the opposing faces. The diaphragm preferably is a polyamide film having a thickness of between 0.003" and 0.005", and is flexible to seal against the opposing surfaces of the two manifold sections.

DETAILED DESCRIPTION OF A PREFERRED EMBODIMENT

Figure 1:
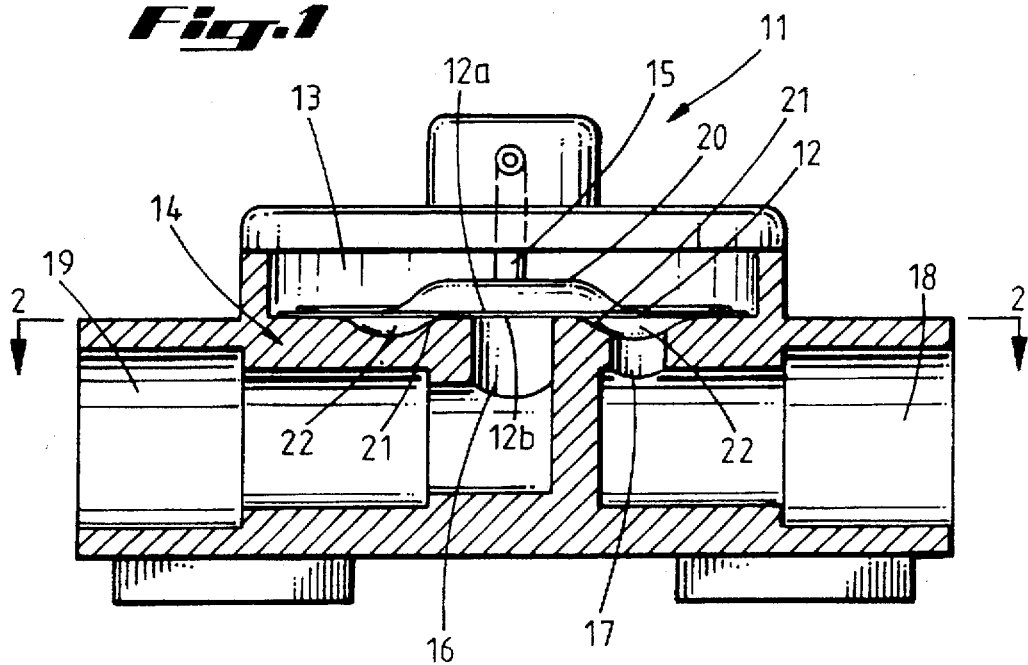
FIG. 1 is a section view of a diaphragm valve according to a preferred embodiment of the present invention.
Figure 2:
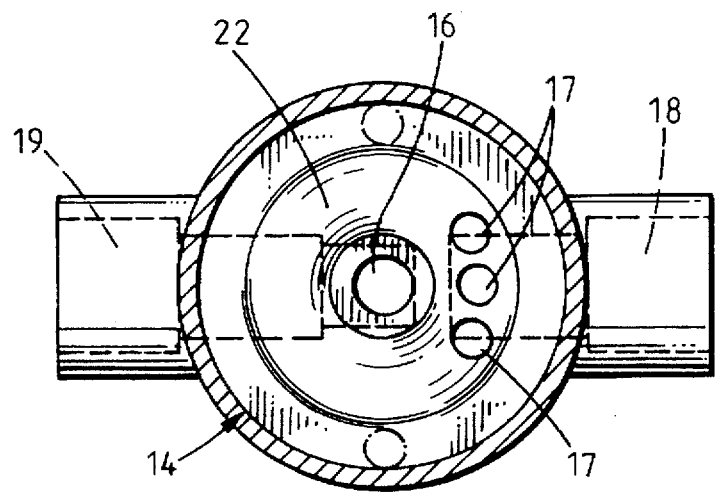
FIG. 2 is a top view of the manifold section 14 in the embodiment of FIG. 1.

First referring to FIG. 1, diaphragm valve 11 consists of a flexible diaphragm 12 sandwiched between two manifold sections 13, 14. The preferred material for diaphragm 12 is polyamide film called Kapton film which is commercially available from Dupont. Polyamide film is preferred over a metal diaphragm which, in testing, failed after approximately 250,000 cycles. Various thicknesses of Kapton file may be used, with a preferred thickness in the range from 0.003 inch to 0.005 inch. The diaphragm valve is surface normal flexible and withstands at least 50 million cycles at low temperatures, such as that of liquid nitrogen, and is rated to liquid helium temperatures.

Kapton film having thickness of between 0.001 and 0.005 inches was tested. The 0.001 inch and 0.002 inch films were rejected because they were susceptible to leakage over a period of use, primarily as a result of wrinkling of the diaphragm. Thicknesses of 0.003" through 0.005" were tested in excess of 1 million cycles without leakage or other failure. The 0.005 inch thickness is most preferred because of an increased safety factor.

The diaphragm valve shown in FIG. 1 is pressure responsive to open and close upon a pressure differential between the opposing sides of diaphragm 12. A pilot valve opens and closes the diaphragm valve by controlling pressure through inlet passage 15 in manifold section 13 against first face 12a of diaphragm 12. In a preferred embodiment, inlet passage 15 has a diameter of 0.0625 inch. A reduced diameter of 0.03125 inch for inlet passage 15 also has been used.

The diameter of inlet passage 15 may be varied if desired. The diameter of inlet passage 15 affects how rapidly the diaphragm valve may be pulsed to open and close. The use of larger diameter tubing (i.e., 0.125 inch) from the pilot valve to inlet passage 15 increases cryogen usage and requires longer to build up pressure on the first face 12a of diaphragm 12 to close the valve. It is desirable to minimize the flow of cryogen through the pilot valve, so the pilot valve is not cooled excessively (i.e., below 30° F.).

When the diaphragm valve is open, cryogen flows across second face 12b of the diaphragm from inlet passage 16 to outlet passages 17, and then out through exhaust port 18. Inlet passage 16 preferably has a diameter of 0.187 inch, although the diameter may be varied depending on the flow rate desired. For example, a diameter of 0.25 inch has been used for inlet passage 16, resulting in a somewhat higher flow rate. The inlet passage is connected to inlet port 19 which in a preferred embodiment has a diameter of 0.406 inch.

In a preferred embodiment, manifold section 14 includes three outlet passages 17, each having a diameter of 0.125 inch. The outlet passages join at exhaust port 18 having a diameter of 0.406 inch. The size and number of outlet passages also may be varied if desired to change the flow rate across the diaphragm valve. Preferably, the total combined surface area of outlet passages 17 is greater than or equal to the surface area of inlet passage 16, thereby allowing rapid evacuation of cryogen across the diaphragm valve. With multiple outlet passages, diaphragm 12 is less likely to wrinkle or undergo other detrimental and permanent deformation over an extended period of use. Additionally, multiple outlet passages help the diaphragm valve close more rapidly by increasing the rate of evacuation of cryogen as second face 12b of diaphragm 12 is closing and sealing against curved surface 21.

In a preferred embodiment, diaphragm 12 has a diameter of 1 inch to 1.5 inches, and an effective surface area of approximately 0.78 sq. inches. The effective surface area on which the cryogen exerts pressure is approximately twenty times the effective area of the orifice.

Diaphragm 12 is sandwiched in the cavity between first manifold section 13 and second manifold section 14. First manifold section 13 has a curved surface 20 and in a preferred embodiment has a maximum depth of 0.078 inch. The curved surface 20 is generally concave and preferably is dish-shaped, and its depth may be varied if desired. However, if too shallow, the diaphragm valve does not allow adequate flow of cryogen. If too deep, the curved surface reduces the speed of operation of the diaphragm valve. In a preferred embodiment, which is configured to minimize the stress on diaphragm 12, each radius of curvature in surface 20 is the same, and preferably is 0.125 inch.

Second manifold section 14 has a curved surface 21 with a ring shaped recess 22 around inlet passage 16. In a preferred embodiment configured to minimize stress on diaphragm 12, each radius of curvature in curved surface 21 is the same, and preferably is 0.125 inch. At its maximum depth of 0.050 inch, ring shaped recess 22 is centered 0.281 inch from inlet passage 16, and outlet passages 18 are located along the ring shaped recess 22.

Preferably, curved surface 20 and curved surface 21 are dimensioned so all radii of curvature are the same, and so the length across each surface is the same. Thus, in a preferred embodiment where curved surface 20 has a maximum depth of 0.078 inch, ring shaped recess 22 has a maximum depth of 0.050 inch, and each curve radius in both surfaces is 0.125 inch, and the length across each surface is approximately 1.168 inches. Equalizing the length on the opposing surfaces 20, 21 means the diaphragm 12 stretches the same amount in the open position against surface 20 as it does to reach the closed position against surface 21. The surfaces are designed with compound curves to minimize bending stresses in the diaphragm and thereby facilitate sealing. The shape of these surfaces helps distribute bending stresses around the largest circumference of diaphragm 12, rather than concentrating bending stresses at or surrounding the inlet and outlet passages.

When cryogen through inlet passage 15 from the pilot valve acting on diaphragm 12 exceeds the pressure acting on the opposite side of the diaphragm, the diaphragm is urged against curved surface 21 to close the valve. When the pressure through inlet passage 15 is reduced, the diaphragm opens. In the open position, the first face 12a of diaphragm 12 is urged against curved surface 20 and conforms to the shape of that surface.

Preferably, the surface around the lip of inlet passage 17 is polished to enhance the seal so as to prevent leakage of cryogen between inlet passage 17 and outlet passages 18 when the diaphragm valve is closed.

First and second manifold sections 13, 14 may be welded together at their outer edges to secure diaphragm 12 between the two surfaces. Alternatively, the first and second manifold sections may be bolted together to secure diaphragm 12 therebetween.

The diaphragm valve is opened and closed by use of a pilot valve. The pilot valve preferably is a normally open poppet valve that is electrically actuated. In a preferred embodiment, the pilot valve is a model ETO-3M valve manufactured by Clippard Instrument Laboratory of Cincinnati, Ohio. It is preferred to drive the pilot valve by the same cryogen source as the diaphragm valve (i.e., tapping off the same liquid nitrogen). Thus, the pressure of cryogen is the same. In a preferred embodiment, cryogen flow to the pilot valve is on the order of 8 cc/min. Preferably, the Pilot valve is heated to minimize the cooling effect of liquid cryogen on the pilot valve. If the pilot valve is heated, nitrogen flows through the pilot valve in a gaseous state.

The pulsing of the pilot valve may be controlled by a temperature sensor or other device monitoring the body or apparatus to be cooled.

Although variations in the embodiment of the present invention may not each realize all the advantages of the invention, certain features may become more important than others in various applications of the device. The invention, accordingly, should be understood to be limited only by the scope of the appended claims.

What is claimed is:

1. A valve for controlling flow of cryogen comprising:
   (a) a first manifold section having a first surface and a first inlet passage extending therethrough to the first surface;
   (b) a second manifold section joined to the first manifold section and having a second surface facing the first surface to form a cavity therebetween, a second inlet passage connected to a source of liquid cryogen and extending through the second manifold section to the second surface, and at least one outlet passage extending through the second manifold section to the second surface;
   (c) a piece of polyamide film sandwiched between the first and second manifold sections and being flexible to move in the cavity between an open position against the first surface and a closed position against the second surface in response to a pressure differential on each side of the polyamide film; and
   an electrically actuated pilot valve connected between the first inlet passage and the source of liquid cryogen for controlling the pressure differential; the maximum flow rate of cryogen through the pilot valve to the first inlet passage being substantially lower than the maximum flow rate from the second inlet passage to the outlet passage whereby the pilot valve is maintained at a higher temperature than the second manifold section.

2. The valve of claim 1 wherein the pilot valve is heated.

3. The valve of claim 1 wherein the second surface comprises a ring shaped recess around the second inlet passage.

4. The valve of claim 3 wherein one end of the at least one outlet passage extends into the ring shaped recess.

5. The valve of claim 1 wherein the length across the first surface is substantially equal to the length across the second surface.

6. The valve of claim 1 wherein the radius of curvature of each of the curves in the first surface and the second surface are substantially equal.

7. A pressure energized valve for cryogenic application, comprising:
   (a) a two piece manifold having adjoining surfaces forming a cavity therebetween with a first surface and a second surface, the first surface having a first passage therein, and the second surface having an inlet passage connected to a source of liquid cryogen and an outlet passage therein for flow of cryogen therethrough;
   (b) a flexible diaphragm interposed between the adjoining surfaces such that the diaphragm can flex between the first surface and second surface; and
   (c) an electrically actuated pilot valve connected to the source of liquid cryogen for selectively pressurizing the first passage to urge the diaphragm against the second surface and block flow of cryogen between the inlet passage and outlet passage, the maximum flow rate of cryogen through the pilot valve being substantially lower than the maximum flow rate of cryogen between the inlet passage and outlet passage; whereby the pilot valve is maintained at a higher temperature than the manifold.

8. The pressure energized valve of claim 7 wherein the first surface comprises a dish-shaped surface.

9. The pressure energized valve of claim 7 wherein the second surface is a curved surface having a ring shaped recess therein.

10. The pressure energized valve of claim 9 wherein the outlet passage comprises three outlet passages connected to an exhaust port.

11. The pressure energized valve of claim 1 wherein the flexible diaphragm is a polyamide film.

12. The pressure energized valve of claim 11 wherein the polyamide film is Kapton film.

13. A diaphragm valve for flow of liquid cryogen, comprising:
   (a) first and second manifold sections having a cavity therebetween, each of the first and the second manifold sections having a flow path connected to a cryogen source;
   (b) a flexible polyamide diaphragm member in the cavity between the first and second manifold sections;
   (c) an electrically actuated pilot valve connected between the cryogen source and the flow path through the first manifold section for providing cryogen into the cavity at a lower maximum flow rate than through the second manifold section to urge the diaphragm member towards the second manifold section to block cryogen flow through the second manifold section; the pilot valve being at a hither temperature than the second manifold section; and
   (d) means for pulsing the pilot valve.

14. The diaphragm valve of claim 13 wherein the first and second manifold sections comprise curved surfaces.

15. The diaphragm valve of claim 14 wherein each radius of curvature on the curved surfaces is substantially the same.

16. The diaphragm valve of claim 13 wherein the means for pulsing comprises an electrical switch functionally connected to a temperature sensor.

17. The diaphragm valve of claim 13 wherein the second manifold section comprises at least one inlet passage and at least two outlet passages.

* * * * *